(12) United States Patent
Ng (10) Patent No.: US 10,647,597 B2
(45) Date of Patent: May 12, 2020

(54) AIR CONVERSION AND CONDENSATION ELECTRO-MAGNETIZATION SYSTEM

(71) Applicant: Tat Yung Ng, Hong Kong (CN)

(72) Inventor: Tat Yung Ng, Hong Kong (CN)

( * ) Notice: Subject to any disclaimer, the term of this patent is extended or adjusted under 35 U.S.C. 154(b) by 142 days.

(21) Appl. No.: 15/609,718

(22) Filed: May 31, 2017

(65) Prior Publication Data
US 2018/0029903 A1 Feb. 1, 2018

(30) Foreign Application Priority Data

Jul. 26, 2016 (CN) .......................... 2016 1 0594481

(51) Int. Cl.
*B01D 5/00* (2006.01)
*F24F 3/16* (2006.01)
(Continued)

(52) U.S. Cl.
CPC .............. *C02F 1/48* (2013.01); *B01D 5/0003* (2013.01); *B01D 5/009* (2013.01); *B01D 5/0051* (2013.01); *B01D 5/0072* (2013.01); *B01D 53/265* (2013.01); *C02F 9/005* (2013.01); *E03B 3/28* (2013.01); *F24F 3/1405* (2013.01); *F24F 3/153* (2013.01); *F24F 3/1603* (2013.01); *B01D 27/00* (2013.01); *B01D 2258/06* (2013.01); *C02F 1/001* (2013.01); *C02F 1/283* (2013.01); *C02F 1/32* (2013.01); *C02F 1/441* (2013.01);
(Continued)

(58) Field of Classification Search
CPC ....... E03B 3/28; Y02A 20/109; Y02A 20/154; Y02A 20/211; Y02A 20/214; C02F 1/001; C02F 1/283; C02F 1/32; C02F 1/441; C02F 2209/42; B01D 5/009
See application file for complete search history.

(56) References Cited

U.S. PATENT DOCUMENTS 8,302,412 B2 * 11/2012 Tieleman .............. C02F 3/1221
426/67
2005/0284167 A1 * 12/2005 Morgan ................. B01D 5/009
62/272

(Continued)

FOREIGN PATENT DOCUMENTS

EP 3120907 A1 * 1/2017 ........... B01D 5/0072

*Primary Examiner* — Claire A Norris
(74) *Attorney, Agent, or Firm* — Muncy, Geissler, Olds & Lowe, P.C.

(57) ABSTRACT

Disclosed is an air conversion and condensation electro-magnetization system which comprises a water production and treatment system, a power source and a control system, wherein the water production and treatment system comprises an air purification and condensation water-production system, a primary filter and storage system, and a water quality optimization system, the output end of the air purification and condensation water-production system is connected with the input end of the primary filter and storage system, and the output end of the primary filter and storage system is connected with the input end of the water quality optimization system. The air conversion and condensation electro-magnetization system can be used for producing high-quality drinking water meeting the drinking standard at reasonable costs in places where energy and electricity are available, and overcome the drinking water difficulty for remote arid areas lacking water sources.

9 Claims, 3 Drawing Sheets

(51) Int. Cl.
*B01D 53/26* (2006.01)
*C02F 1/48* (2006.01)
*F24F 3/14* (2006.01)
*E03B 3/28* (2006.01)
*F24F 3/153* (2006.01)
*C02F 9/00* (2006.01)
*F24F 6/00* (2006.01)
*F24F 110/10* (2018.01)
*F24F 11/77* (2018.01)
*F24F 11/30* (2018.01)
*F24F 110/20* (2018.01)
*C02F 1/28* (2006.01)
*C02F 1/66* (2006.01)
*C02F 1/44* (2006.01)
*C02F 1/461* (2006.01)
*C02F 1/32* (2006.01)
*C02F 1/00* (2006.01)
*B01D 27/00* (2006.01)

(52) U.S. Cl.
CPC .............. *C02F 1/4618* (2013.01); *C02F 1/66* (2013.01); *C02F 2201/009* (2013.01); *C02F 2201/48* (2013.01); *C02F 2209/06* (2013.01); *F24F 11/30* (2018.01); *F24F 11/77* (2018.01); *F24F 2006/006* (2013.01); *F24F 2110/10* (2018.01); *F24F 2110/20* (2018.01); *Y02A 20/109* (2018.01); *Y02A 20/154* (2018.01); *Y02W 10/37* (2015.05)

(56) References Cited

U.S. PATENT DOCUMENTS

| | | | |
|---|---|---|---|
| 2006/0076286 A1* | 4/2006 | Bolin | B67D 3/0009 210/282 |
| 2008/0011662 A1* | 1/2008 | Milosavljevic | B01D 46/0023 210/284 |
| 2012/0261349 A1* | 10/2012 | Kolstad | C02F 1/32 210/695 |
| 2014/0138236 A1* | 5/2014 | White | B01D 5/0006 202/185.3 |

* cited by examiner

AIR CONVERSION AND CONDENSATION ELECTRO-MAGNETIZATION SYSTEM

BACKGROUND OF THE INVENTION

Technical Field

The invention relates to water-production systems, in particular to an air conversion and condensation electro-magnetization system.

Description of Related Art

Existing fresh water resources which can be easily utilized by humans are mainly from rivers, lakes and shallow groundwater; fresh water resources are deficient due to large consumption, and clean water resources in places with abundant electricity and energy are also relatively deficient and need to be saved and protected due to serious pollution and extremely imbalanced regional distribution; water resources have already been precious resources for humans, and water resource problems have even become a major strategy concerning sustainable development of the national economy and society, and lasting political stability.

In certain remote arid and distressed areas where clean water resources are extremely difficult to obtain and water resource shortages exist, it is hard to lay long delivery pipelines for long-distance supply of drinking water, or to transport drinking water back and forth through transportation facilities without considering transportation costs, or to mount large water quality optimization systems, and consequentially, the cost of safe drinking water becomes extremely high; besides the high drinking water cost, water quality changes or secondary pollution can be caused by long-distance delivery or transportation, and consequentially, water cannot be directly drunk by people safely.

In addition, although the personal demands for drinking water of people in daily life are not definitely huge (the personal demands are different according to different areas, different climates and different environments), the requirements for the sanitation, cleanliness, sterility and non-toxicity of the drinking water are high; a solution to the production of pure drinking water at reasonable costs in places where energy and electricity are available is a significant problem urgently needing to be solved.

BRIEF SUMMARY OF THE INVENTION

For solving the technical problems, the invention provides an air conversion and condensation electro-magnetization system used for producing clean drinking water by means of energy at reasonable costs.

According to the technical scheme adopted by the invention for solving the technical problems, the air conversion and condensation electro-magnetization system comprises a water production and treatment system, a power source and a control system, wherein the water production and treatment system comprises an air purification and condensation water-production system, a primary filter and storage system, and a water quality optimization system, the output end of the air purification and condensation water-production system is connected with the input end of the primary filter and storage system, and the output end of the primary filter and storage system is connected with the input end of the water quality optimization system According to the air conversion and condensation electro-magnetization system, the water production and treatment system comprises a standby water source filter system, and the output end of the standby water source filter system is connected with the input end of the primary filter and storage system.

According to the air conversion and condensation electro-magnetization system, the air purification and condensation water-production system comprises at least one water-production device, wherein the water-production device comprises a unit body, a water collection tank and a refrigeration system, the refrigeration system comprises evaporators and a condenser, and the evaporators are arranged on the side faces of the unit body; the water collection tank is arranged at the bottom of the unit body and located below the evaporators, and the condenser is arranged at the top of the unit body; outside air enters the unit body through the evaporators located on the side faces of the unit body and then is exhausted from air outlets in the top of the unit body through the condenser.

According to the air conversion and condensation electro-magnetization system, the water-production device comprises filter screens, the front end and the rear end of the unit body are sealed, and the evaporators are arranged on the two sides of the unit body; the filter screens are arranged on the outer sides of the evaporators, and outside air enters the unit body through the filter screens and the evaporators.

According to the air conversion and condensation electro-magnetization system, the water-production device comprises a water pump and a control unit, wherein the control unit comprises a controller, a temperature sensor, a humidity sensor and a water level sensor, and the output end of the temperature sensor and the output end of the humidity sensor are connected with the controller; the condenser comprises a plurality of fans, the fans are driven by a variable frequency motor, and a driving circuit of the fans is connected with the controller; the controller determines the number of fans needing to be started according to data collected by the temperature sensor and the humidity sensor, adjusts the rotating speed of the fans according to data collected by the temperature sensor and the humidity sensor, and starts or stops the water pump according to data collected by the water level sensor.

According to the air conversion and condensation electro-magnetization system, the standby water source filter system comprises a filter device, water softening equipment, an RO protection filter, a water pump and a reverse osmosis (RO) device, wherein the filter device, the water softening equipment, the RO protection filter, the water pump and the reverse osmosis (RO) device are sequentially connected in series; the filter device comprises a fiber filter, a quartz sand filter and an active carbon filter, the fiber filter, the quartz sand filter and the active carbon filter are sequentially connected in series, an inlet of the fiber filter is connected with a standby water source, an outlet of the active carbon filter is connected with the water softening equipment, and an outlet of the reverse osmosis (RO) device is connected with the input end of the primary filter and storage system.

According to the air conversion and condensation electro-magnetization system, the primary filter and storage system comprises a water pump, a filter device, an ultraviolet sterilization device, a water storage device and a control circuit, wherein the filter device comprises a fiber mesh filter, a PP cotton filter, a quartz sand filter, a particle carbon filter and an active carbon filter, the fiber mesh filter, the PP cotton filter, the quartz sand filter, the particle carbon filter and the active carbon filter are sequentially connected in series, the fiber mesh filter is connected with the input end of the primary filter and storage system through the water pump, an outlet of the active carbon filter is connected with the ultraviolet sterilization device, and an outlet of the ultraviolet sterilization device is connected with the water storage device; the control circuit comprises a controller, the water storage device comprises a plurality of water containers, each water container comprises a water level alarm device, a water inlet electromagnetic valve and a water outlet electromagnetic valve, and the signal output end of each water level alarm device, the control end of each water inlet electromagnetic valve and the control end of each water outlet electromagnetic valve are all connected with the controller; the control end of a driving circuit of the water pump is connected with the controller.

According to the air conversion and condensation electro-magnetization system, the water quality optimization system comprises a water pump, a water purification device, a water storage device, a controller, a power source, a pH value regulation device and a water magnetization device, wherein an inlet of the water pump is connected with the primary filter and storage system, and an outlet of the water pump is connected with the pH value regulation device; the pH value regulation device is connected with the water storage device through the water purification device, and the water storage device is connected with a system outlet through the water magnetization device; the water storage device comprises a pH value detector and a plurality of water receivers. The water receivers are connected with the inlet of the water pump through corresponding electromagnetic valves respectively; the signal output end of the pH detector is connected with the controller, and the control ends of the electromagnetic valves and the control end of the driving circuit of the water pump are all connected with the controller.

According to the air conversion and condensation electro-magnetization system, the power source is a solar power source.

According to the air conversion and condensation electro-magnetization system, parameters and operating data of the air purification and condensation water-production system, the primary filter and storage system, and the water quality optimization system are transmitted to the control system, and unified scheduling and production are achieved according to a command from the control system; the control system coordinates, starts and stops the water-production devices according to the water storage quantity, and the number of the water-production devices is increased or decreased, so that the air purification and condensation water-production system, the primary filter and storage system, and the water quality optimization system operate automatically in the most energy-saving and environment-friendly state.

The air conversion and condensation electro-magnetization system of the invention can be used for producing high-quality drinking water meeting the drinking standard at reasonable costs in places where energy and electricity are available, and overcome the drinking water difficulty for remote arid areas lacking water sources.

BRIEF DESCRIPTION OF THE SEVERAL VIEWS OF THE DRAWINGS

A further detailed description of the invention is given with accompanying drawings and specific execution modes as follows.

DETAILED DESCRIPTION OF THE INVENTION

Figure 1:
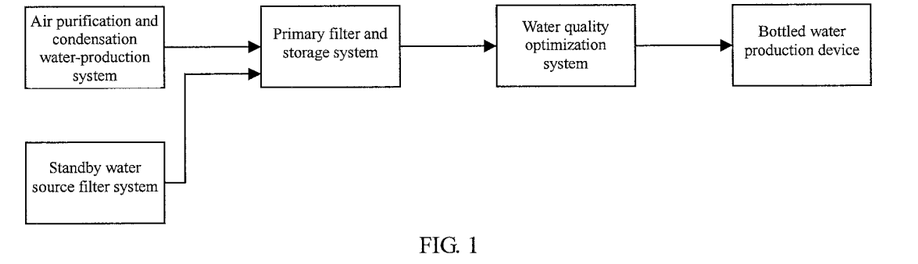
FIG. 1 is a chart of an air conversion and condensation electro-magnetization system of an embodiment of the invention.

As is shown in FIG. 1, an air conversion and condensation electro-magnetization system of an embodiment of the invention structurally comprises a water production and treatment system, a power source and a control system. The water production and treatment system comprises an air purification and condensation water-production system, a standby water source filter system, a primary filter and storage system, and a water quality optimization system. The output end of the air purification and condensation water-production system and the output end of the standby water source filter system are both connected with the input end of the primary filter and storage system, the output end of the primary filter and storage system is connected with the input end of the water quality optimization system, and the output end of the water quality optimization system is connected with a bottled water production line. In the embodiment, the power source can be a solar power source.

The air purification and condensation water-production system of the embodiment of the invention comprises a main control unit and a plurality of water-production devices.

Figure 2:
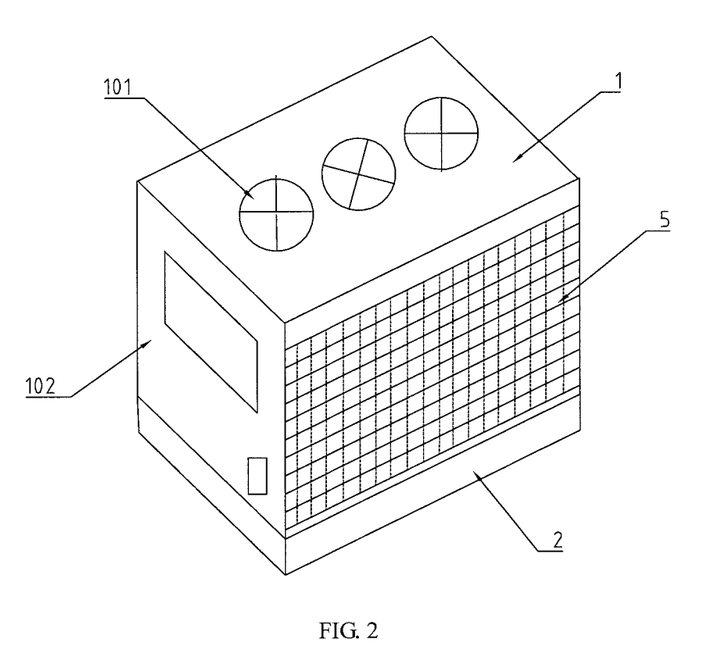
FIG. 2 is an outside view of a water-production device of an embodiment of the invention.
Figure 3:
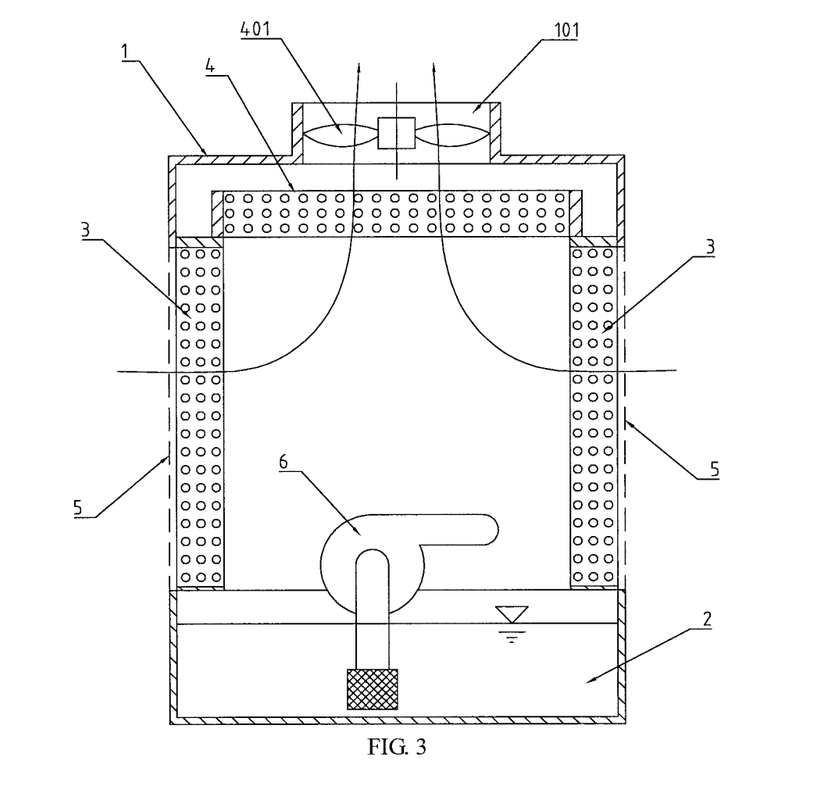
FIG. 3 is a transverse sectional view of the water-production device of the embodiment of the invention.

As is shown in FIG. 2 and FIG. 3, the water-production device structurally comprises a unit body 1, a water collection tank 2, metal filter screens 5, a water pump 6, a control unit and a refrigeration system.

A controller of the water-production device is connected with the main control unit of the water-production system.

The refrigeration system comprises a compressor, a throttle valve, evaporators 3 and a condenser 4. The evaporators 3 are arranged on the two sides of the unit body 1, and the front end and the rear end of the unit body 1 are sealed. The water collection tank 2 is arranged at the bottom of the unit body 1 and located below the evaporators 3, and the condenser 4 is arranged at the top of the unit body 1.

The metal filter screens 5 are arranged on the outer sides of the evaporators 3, outside air enters the unit body 1 through the metal filter screens 5 and the evaporators 3 and then is exhausted from air outlets 101 in the top of the unit body 1 through the condenser 4, heat is absorbed by the evaporators when the air passes through the evaporators 3, the temperature is decreased sharply, water vapor in the air is condensed into water drops, and the water drops drip into a water collector below.

The control unit comprises a controller, a water level sensor, a temperature sensor and a humidity sensor, and the output end of the temperature sensor and the output end of the humidity sensor are connected with the controller. The condenser 4 comprises a plurality of fans 401, the fans 401 are driven by a variable frequency motor, and a driving circuit of the variable frequency motor is connected with the controller. A control panel 102 of the water-production device is arranged at the front end of the unit body 1.

A driving circuit of the water pump 6 is connected with the controller. The water level sensor is mounted in the water collection tank 2, and the output end of the water level sensor is connected with the controller.

The air purification and condensation water-production system is composed of a plurality of water-production devices which operate independently, the number of combined water-production devices can be determined according to requirements, and the system can produce 10,000-1,000,000 liters of water every day according to the number of the water-production devices.

Each water-production device in the embodiment of the invention is controlled by one control unit, and production, operation and alarm signals of each water-production device are all summarized into a main control unit of a central control room, and all the water-production devices are flexibly, safely and environmentally friendly coordinated by the main control unit of the central control room in an energy-saving mode.

The control unit of each water-production device controls the water-production function according to different working conditions in the external environment, data of the humidity sensors and the temperature sensors are summarized into the controllers, and the controllers adjust the air quantity by controlling the number (generally one to three) of operating fans and the operating speed of the fans, so that the optimal water production quantity is obtained, and water is produced through air purification and condensation in the most environment-friendly and energy-saving state. When the humidity of the external environment is low, the speed or the number of the fans is decreased, and the fans are even stopped; when the humidity of the external environment is high, the speed or the number of the fans is increased.

According to the embodiment of the invention, the evaporators are arranged on the two sides of the unit body of each water-production device, and the metal filter screens are arranged on the outer layer of each water-production device, so that ordinary sand and dust are isolated, the evaporators are protected, and the water production quality is improved; the evaporators on the two sides purify and condense air according to the air quantity for water production, and then condensate water is collected through the water collectors below the evaporators; when the water levels of the water collectors reach certain values, signals are emitted by the water level sensors and transmitted to the controllers, then the main control unit of the central control room is informed by the controllers, and the water pumps are synchronously started to pump the condensate water in the water collectors to a filter system.

The fans at the tops of the unit bodies pump air into the unit bodies from the outside of the evaporators, and the air passes through the condensers to cool high-pressure refrigerants; the air has already been cooled (with the temperature being lower than the outside temperature) by the evaporators after passing through the evaporators, and the cold air cools the high-pressure refrigerants when passing through the condensers; compared with a method for cooling high-pressure refrigerants through outside normal-temperature air, the efficiency is high; through the configuration, the size of the condensers can be reduced, the refrigeration systems are utilized more effectively, and the compression power is lowered; the system is more environmentally friendly and capable of saving more energy, and the water production quantity can be increased while the size of the unit bodies is reduced.

Figure 4:
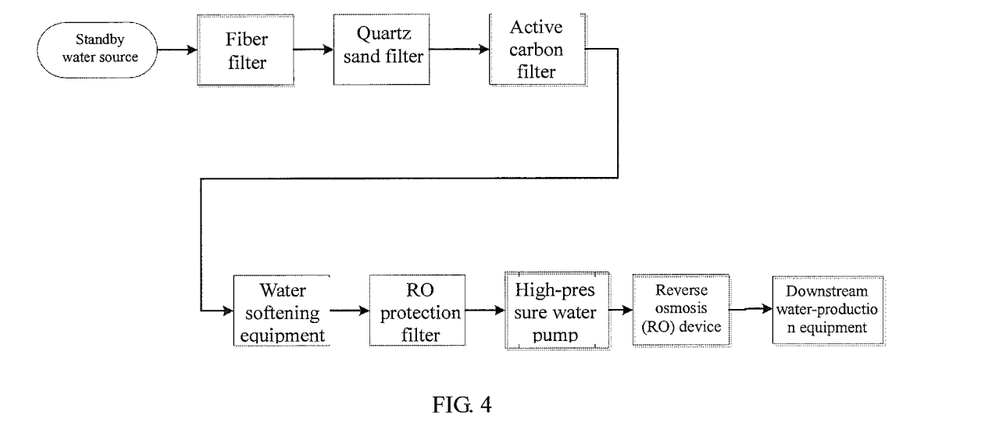
FIG. 4 is a chart of a standby water source filter system of an embodiment of the invention.

As is shown in FIG. 4, the standby water source filter system structurally comprises a filter device, a high-pressure water pump, water softening equipment, an RO protection filter and a reverse osmosis (RO) device, wherein the filter device, the water softening equipment, the RO protection filter and the reverse osmosis (RO) device are sequentially connected in series, the high-pressure water pump is connected between the RO protection filter and the reverse osmosis (RO) device, an inlet of the filter device is connected with a standby water source, and an outlet of the reverse osmosis (RO) device is connected with downstream water-production equipment.

Wherein, the filter device comprises a fiber filter, a quartz sand filter and an active carbon filter, the fiber filter, the quartz sand filter and the active carbon filter are sequentially connected in series, an inlet of the fiber filter is connected with the standby water source, and an outlet of the active carbon filter is connected with the water softening equipment.

In the embodiment, the fiber filter comprises a PP cotton filter and a fiber mesh filter.

According to the standby water source filter system, impurities in the standby water source which can be tap water or a polluted water source are removed through the PP cotton filter, the quartz sand filter and the active carbon filter, then water is softened through electrolysis by the water softening equipment, the softened water then enters the RO protection filter, and the water source is pressurized through the high-pressure water pump and directly pumped to a reverse osmosis (RO) system to be purified. Finally, the purified water source is connected to the downstream water-production equipment.

In this way, when the air humidity is too low, the air conversion and condensation electro-magnetization system can use tap water or a polluted water source as the standby water source for producing bottled magnetized pure water through the standby water source filter system.

Figure 5:
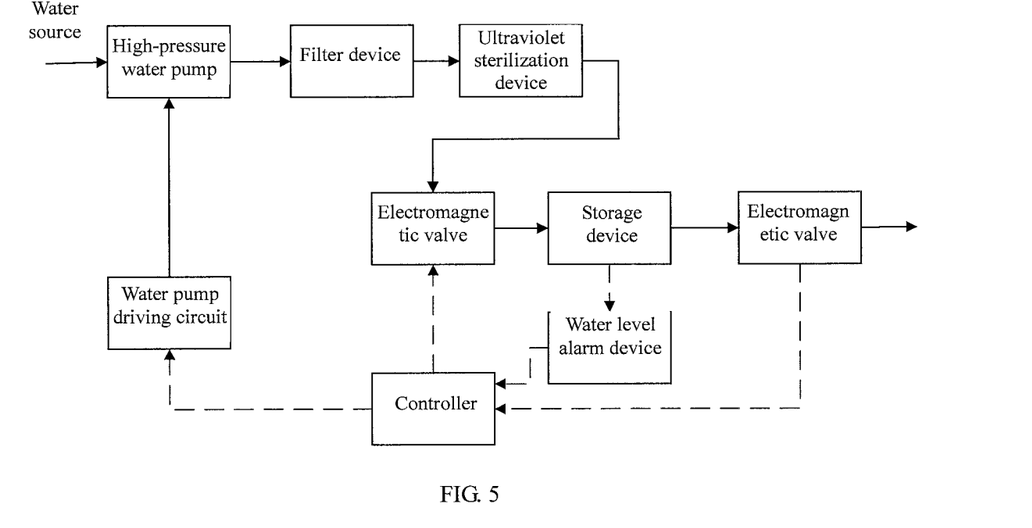
FIG. 5 is a chart of a primary filter and storage system of an embodiment of the invention.

As is shown in FIG. 5, the primary filter and storage system structurally comprises a power source, a high-pressure water pump, a filter device, an ultraviolet sterilization device, a water storage device and a control circuit, wherein an inlet of the filter device is connected with a water source, and an outlet of the filter device is connected with the ultraviolet sterilization device; an outlet of the ultraviolet sterilization device is connected with the water storage device.

Wherein, the filter device comprises a fiber mesh filter, a PP cotton filter, a quartz sand filter, a particle carbon filter and an active carbon filter. The fiber mesh filter, the PP cotton filter, the quartz sand filter, the particle carbon filter and the active carbon filter are sequentially connected in series, the fiber mesh filter is connected with the water source through the high-pressure water pump, and an outlet of the active carbon filter is connected with the ultraviolet sterilization device.

The control circuit comprises a controller, the water storage device comprises a plurality of water containers, each water container comprises a water level alarm device, a water inlet electromagnetic valve and a water outlet electromagnetic valve, and the signal output end of each water level alarm device, the control end of each water inlet electromagnetic valve and the control end of each water outlet electromagnetic valve are all connected with the controller; the control end of a high-pressure water pump driving circuit is connected with the controller.

The primary filter and storage system of the embodiment of the invention can collect the water source of a plurality of air purification and condensation water-production systems, for avoiding the influence on the water-production quantity and the increase of the size of the unit bodies, only simple filtration is conducted by the water-production systems, and the primary filter and storage system is responsible for major water source filtration and purification after water production; all water source filtration, purification and sterilization work of the system is promoted through the high-pressure water pump, the operating condition and information of the system are monitored through the controller of the control circuit of the system in each procedure, and the operating information, the system working condition and alarm information are summarized and synchronously transmitted to a master control system of a central control room through the controller.

According to the primary filter and storage system, the water source is purified and odors in the water are absorbed when the water source passes through the filter device, the purified water passes through a stainless steel high-energy ultraviolet sterilization system before entering the water storage device, and the water source enters the water storage device after being further optimized.

The water storage device of the primary filter and storage system is composed of a plurality of water tanks, the water inlet and water outlet of each water tank are controlled by the control system through a water level alarm device and electromagnetic valves, the storage quantity and the using quantity are also monitored, and when the storage quantity is too large, an upstream water-production system can be informed through a monitoring system of the central control room to stop distributing water, so that water source waste is avoided, and equipment loss is reduced.

The primary filter and storage system can be used for primary optimization and storage of pure water obtained through air purification and condensation, and thus the pure water can be further optimized by the next-stage water purification system conveniently to reach the standard of the optimal drinking water. Meanwhile, the primary filter and storage system can reduce the load of the next-stage water purification system, the service life of an RO mold is prolonged, flushing and sewage discharge of the RO mold are reduced, and emissions are reduced while energy is saved.

Figure 6:
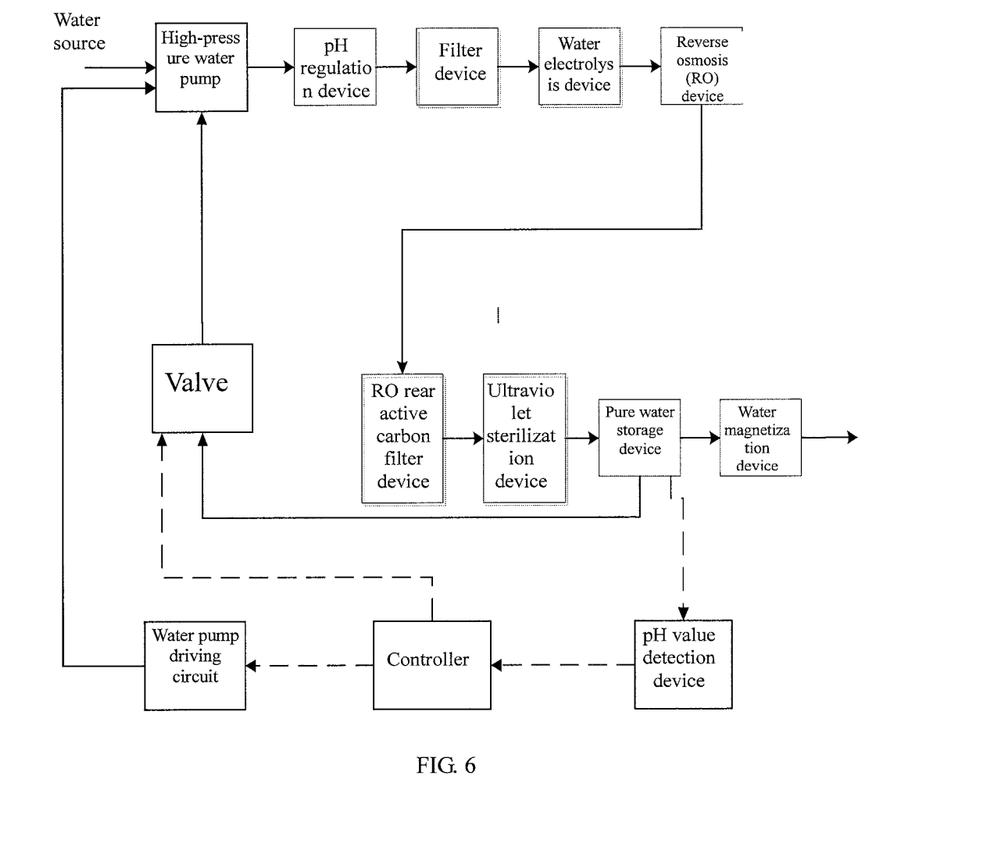
FIG. 6 is a left view of the air conversion and condensation electro-magnetization system of the embodiment of the invention.

As is show in FIG. 6, the water quality optimization system comprises a high-pressure water pump, a water purification device, a water storage device, a controller, a solar power source, a pH value regulation device and a water magnetization device.

The water purification device comprises a filter, a water electrolysis device, a reverse osmosis (RO) device, an RO rear active carbon filter device and an ultraviolet sterilization device.

The filter, the water electrolysis device, the reverse osmosis (RO) device, the RO rear active carbon filter device and the ultraviolet sterilization device are sequentially connected in series, the filter is connected with the pH value regulation device, and the ultraviolet sterilization device is connected with the water storage device.

An inlet of the high-pressure water pump is connected with a pure water source, an outlet of the high-pressure water pump is connected with the pH value regulation device, the pH value regulation device is connected with the water storage device through the water purification device, and the water storage device is connected with a system outlet through the water magnetization device and further connected with the inlet of the high-pressure pump through valves; the water storage device comprises a pH value detector, the signal output end of the pH value detector is connected with the controller, and the control ends of the valves and the control end of a high-pressure water pump driving circuit are all connected with the controller.

The valves are electromagnetic valves, and the water storage device comprises a plurality of water receivers. The water receivers are connected with the inlet of the high-pressure water pump through the corresponding electromagnetic valves respectively.

The water quality optimization system comprises the high-pressure water pump, the water purification device, the water storage device, the controller, the solar power source, the pH value regulation device and the water magnetization device.

The water purification device comprises the filter, the water electrolysis device, the reverse osmosis (RO) device, the RO rear active carbon filter device and the ultraviolet sterilization device.

The filter, the water electrolysis device, the reverse osmosis (RO) device, the RO rear active carbon filter device and the ultraviolet sterilization device are sequentially connected in series, the filter is connected with the pH value regulation device, and the ultraviolet sterilization device is connected with the water storage device.

The inlet of the high-pressure water pump is connected with the pure water source, the outlet of the high-pressure water pump is connected with the pH value regulation device, the pH value regulation device is connected with the water storage device through the water purification device, and the water storage device is connected with the system outlet through the water magnetization device and further connected with the inlet of the high-pressure pump through valves; the water storage device comprises the pH value detector, the signal output end of the pH value detector is connected with the controller, and the control ends of the valves and the control end of the high-pressure water pump driving circuit are all connected with the controller.

The valves are electromagnetic valves, and the water storage device comprises a plurality of water receivers. The water receivers are connected with the inlet of the high-pressure water pump through the corresponding electromagnetic valves respectively.

According to the embodiment of the invention, the pH value of pure water provided by the water source is detected and then balanced and regulated, no additive is added during the balancing and regulating process, the water is electrolyzed and balanced into acid water or alkaline water by an electrolysis method according to the pH value of the water, and the system can further regulate the pure water into alkalescent water for drinking and make the water reach the standard of optimal drinking water.

Certain impurities can be generated after the pH value of the pure water is balanced and need to be isolated and removed through the filter device, the pure water then enters the water softening device of the water electrolysis device and is changed into soft water by reducing the hardness of the water to 70 mg/l or below according to the ion exchange principle, namely by exchanging $Mg^{2+}Ca^{2+}$ with $Na^+$, and thus the pure water is optimized.

The optimized pure water is comprehensively filtered (such as impurities and heavy metals) and sterilized through the reverse osmosis (RO) device and enters the water storage device after passing through the active carbon filter device and the stainless steel high-energy ultraviolet sterilization device.

The water storage device starts a circulating device to activate the pure water according to the pH value and storage time of water in each water tank, and the specific process is as follows: the pH value is monitored through the pH value detector in the water storage device, if it is found that the pH value of water in a certain pure water tank does not meet the standard, an alarm can be given to the controller of the system and be synchronized into a master monitoring system of the central control room, the controller starts the high-pressure water pump and opens the corresponding electro-magnetic valve, pure water in the water tank not meeting the pH value standard is circulated, and thus the pure water can be balanced circularly. Meanwhile, the storage time of water in each tank is recorded and stored in the controller and the master control system of the central control room, if the pure water in a certain water tank is not utilized in a set period of time, the master control system of the central control room can give out a command to the circulating system, and the pure water in the tank is activated circularly.

Finally, the water storage device supplies water to the magnetization device according to the production requirement, and then the water is supplied to an automatic bottled water production system to be bottled and packaged.

The air conversion and condensation electro-magnetization system of the embodiment of the invention is an integral system and is mainly composed of the air purification and condensation water-production system which serves as a water-production part, the standby water source filter system which is a seven-stage-purification water source filter system and is used under the condition that the air moisture is insufficient in certain seasons or in certain areas, the primary filter and storage system which is used for purifying and collecting the water source to make the storage quantity of a central storage system sufficient and guarantee that downstream systems produce and use the water source according to the use quantity, and achieves the energy saving and environment protecting functions, and the water quality optimization system which is a two-stage-purification water circulating and returning system and is mainly used for balancing the pH value of the water source, achieving deep sterilization, re-circulating the water source under the condition that the water source is not used in a period of time after the water source is purified and the pH value is balanced, making the pure water in a sterile and alkalescent state and finally supplying the water source to the downward production system according to production and using requirements.

Parameters and operating data of the subsystems are transmitted to the master control system through independent control systems, so that the subsystems cooperate mutually for production and scheduling. The control systems of all the subsystems schedule production in a unified mode according to the command of the master control system (the air conversion and condensation electro-magnetization system). The master control system coordinates, starts and stops a plurality of air purification and condensation water-production systems according to the water storage quantity, and the number of the water-production systems is increased or decreased so that all the systems can automatically operate in the most energy-saving and environment-friendly state. The master control system is arranged in the central control room and monitors the overall operation, an operator monitors the production process according to operating signals and alarms fed back by all the subsystems, and all production and operation are fully automatic.

According to the embodiment of the invention, the high standards of environmental friendliness and safety are achieved through the interrelation and mutual complementation of the integrated system and the inferior subsystems, and the whole system is suitable for being used in the ecological environments where water sources are insufficient, cannot be drunk and have already been polluted, and the areas and environments such as oceans, islands and military use. Solar energy can be used by the multiple subsystems for power generation, the environment-friendly and energy-saving functions are achieved, the system is particularly suitable for coastal areas, rivers, islands and inland areas where air is humid, and the best advantage of the system can be better brought into play in a sufficient sunlight environment.

What is claimed is:

1. An air conversion and condensation electro-magnetization system, comprising a water production and treatment system, a power source and a control system, wherein the water production and treatment system comprises an air purification and condensation water-production system, a primary filter and storage system, and a water quality optimization system, the output end of the air purification and condensation water-production system is connected with the input end of the primary filter and storage system, and the output end of the primary filter and storage system is connected with the input end of the water quality optimization system;

wherein the air purification and condensation water-production system comprises at least one water-production device; and wherein the water-production device comprises a water pump, a condenser and a control unit, wherein the control unit comprises a controller, a temperature sensor, a humidity sensor and a water level sensor, and the output end of the water level sensor, the output end of the temperature sensor and the output end of the humidity sensor are connected with the controller; the condenser comprises a plurality of fans, the fans are driven by a variable frequency motor, and a driving circuit of the fans is connected with the controller; the controller determines the number of fans needing to be started according to data collected by the temperature sensor and the humidity sensor, adjusts the rotating speed of the fans according to data collected by the temperature sensor and the humidity sensor, and starts or stops the water pump according to data collected by the water level sensor;

wherein the water-production device comprises a unit body, a water collection tank and a refrigeration system, the refrigeration system comprises evaporators and the condenser, and the evaporators are arranged on the side faces of the unit body; the water collection tank is arranged at the bottom of the unit body and located below the evaporators, and the condenser is arranged at the top of the unit body; outside air enters the unit body through the evaporators located on the side faces of the unit body and then is exhausted from air outlets in the top of the unit body through the condenser.

2. The air conversion and condensation electro-magnetization system according to claim 1, wherein the water production and treatment system comprises a standby water source filter system, and the output end of the standby water source filter system is connected with the input end of the primary filter and storage system.

3. The air conversion and condensation electro-magnetization system according to claim 1, wherein the water-production device comprises filter screens, the front end and the rear end of the unit body are sealed, and the evaporators are arranged on the two sides of the unit body; the filter screens are arranged on the outer sides of the evaporators, and outside air enters the unit body through the filter screens and the evaporators.

4. The air conversion and condensation electro-magnetization system according to claim 2, wherein the standby water source filter system comprises a filter device, water softening equipment, an RO protection filter, a water pump and a reverse osmosis (RO) device, wherein the filter device, the water softening equipment, the RO protection filter, the water pump and the reverse osmosis (RO) device are sequentially connected in series; the filter device comprises a fiber filter, a quartz sand filter and an active carbon filter, the fiber filter, the quartz sand filter and the active carbon filter are sequentially connected in series, an inlet of the fiber filter is connected with a standby water source, an outlet of the active carbon filter is connected with the water softening equipment, and an outlet of the reverse osmosis (RO) device is connected with the input end of the primary filter and storage system.

5. The air conversion and condensation electro-magnetization system according to claim 1, wherein the primary filter and storage system comprises a first water pump, a filter device, an ultraviolet sterilization device, a first water storage device and a control circuit, wherein the filter device comprises a fiber mesh filter, a PP cotton filter, a quartz sand filter, a particle carbon filter and an active carbon filter, the fiber mesh filter, the PP cotton filter, the quartz sand filter, the particle carbon filter and the active carbon filter are sequentially connected in series, the fiber mesh filter is connected with the input end of the primary filter and storage system through the first water pump, an outlet of the active carbon filter is connected with the ultraviolet sterilization device, and an outlet of the ultraviolet sterilization device is connected with the first water storage device; the control circuit comprises a controller, the first water storage device comprises a plurality of water containers, each water container comprises a water level alarm device, a water inlet electromagnetic valve and a water outlet electromagnetic valve, and the signal output end of each water level alarm device, the control end of each water inlet electromagnetic valve and the control end of each water outlet electromagnetic valve are all connected with the controller; the control end of a driving circuit of the first water pump is connected with the controller.

6. The air conversion and condensation electro-magnetization system according to claim 5, wherein the water quality optimization system comprises a second water pump, a water purification device, a second water storage device, a controller, a power source, a pH value regulation device and a water magnetization device, wherein an inlet of the second water pump is connected with the primary filter and storage system, and an outlet of the second water pump is connected with the pH value regulation device; the pH value regulation device is connected with the second water storage device through the water purification device, and the second water storage device is connected with a system outlet through the water magnetization device; the second water storage device comprises a pH value detector and a plurality of water receivers, and the water receivers are connected with the inlet of the second water pump through corresponding electromagnetic valves respectively; the signal output end of the pH detector is connected with the controller, and the control ends of the electromagnetic valves and the control end of the driving circuit of the second water pump are all connected with the controller.

7. The air conversion and condensation electro-magnetization system according to claim 1, wherein the power source is a solar power source.

8. The air conversion and condensation electro-magnetization system according to claim 1, wherein parameters and operating data of the air purification and condensation water-production system, the primary filter and storage system, and the water quality optimization system are transmitted to the control system, and unified scheduling and production are achieved according to a command from the control system; the control system coordinates, starts and stops the water-production devices according to the water storage quantity, and the number of the water-production devices is increased or decreased, so that the air purification and condensation water-production system, the primary filter and storage system, and the water quality optimization system are made to operate automatically in the most energy-saving and environment-friendly state.

9. The air conversion and condensation electro-magnetization system according to claim 1, wherein the water-production device comprises a unit body, a water collection tank and a refrigeration system,
wherein the refrigeration system comprises evaporators extending along a respective side face of the unit body, a condenser arranged along a respective side face of the unit body, an air outlet disposed at a top of the unit body, and filter screens disposed on the respective side faces of the unit body and disposed along and covering an outer side of the evaporators;
wherein the water collection tank is arranged along a bottom of the unit body below the evaporators; and
wherein outside air enters the unit body through the evaporators and the filter screens and then is exhausted from the air outlet in the top of the unit body through the condenser.

* * * * *